(12) United States Patent
Roberts

(10) Patent No.: US 6,590,397 B2
(45) Date of Patent: Jul. 8, 2003

(54) LINE DIFFERENTIAL PROTECTION SYSTEM FOR A POWER TRANSMISSION LINE

(75) Inventor: Jeffrey B. Roberts, Viola, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 09/895,504

(22) Filed: Jun. 29, 2001

(65) Prior Publication Data

US 2002/0101229 A1 Aug. 1, 2002

Related U.S. Application Data

(63) Continuation-in-part of application No. 09/693,669, filed on Oct. 19, 2000.

(51) Int. Cl.[7] .......................... G01R 31/08; G01R 19/00; G06F 19/00
(52) U.S. Cl. ...................... 324/521; 324/522; 324/107; 702/59
(58) Field of Search ................................. 324/521, 522, 324/107, 525, 86; 702/59, 58; 361/80, 62, 63; 714/799

(56) References Cited

U.S. PATENT DOCUMENTS 4,841,405 A * 6/1989 Udren .......................... 361/80
5,796,258 A * 8/1998 Yang ........................... 324/521
6,148,267 A * 11/2000 Premerlani ................... 324/521
6,256,592 B1 * 7/2001 Roberts et al. .............. 324/512

* cited by examiner

Primary Examiner—Christine Oda
Assistant Examiner—James Kerveros
(74) Attorney, Agent, or Firm—Jensen & Puntigam, P.S.

(57) ABSTRACT

In a three terminal power line current differential protection system, all three phase current values ($I_A$, $I_B$ and $I_C$) are obtained from all three terminals. The current values for each phase are processed in three successive processing operations, using in turn the current values from each terminal as local current values and the combination of the other two terminal current values in each case as the remote current values. The resulting local and remote current values are then processed against preselected values which establish a restrain region in the current ratio (alpha) plane. Current values for each set of local and combined remote currents which result in the ratio being within the restrain region result in a blocking signal while current values which result in a ratio outside of the region result in a tripping signal. If the outputs of the three processing operations agree, then that signal is the system output. If there is disagreement, the output produced when the terminal having the largest current (Imax) value is the local current is the system output.

5 Claims, 10 Drawing Sheets

LINE DIFFERENTIAL PROTECTION SYSTEM FOR A POWER TRANSMISSION LINE

PRIOR APPLICATION

This is a continuation-in-part of pending U.S. application Ser. No. 09/693,669, filed Oct. 19, 2000.

TECHNICAL FIELD

This invention relates generally to power transmission line protection systems, and more specifically concerns a line differential protection system for power transmission lines.

BACKGROUND OF THE INVENTION

Modern power systems typically require high speed fault clearing to preserve the transient (short term) stability of the system and to provide better power quality by reduction in reduced voltage (voltage sag) duration. The most widely used fault protection systems satisfying such requirements for transmission lines, i.e. those power lines with nominal voltages of 115 KV and greater, are directional protection systems using directional comparison techniques. While the directional comparison approach has some advantages, including low channel (communication) requirements between relays positioned at the local and remote ends of the power line, along with inherent redundancy, it does require voltage values obtained from the power signal on the power line. Such systems experience problems (often severe problems) because of voltage errors or missing voltages caused by small voltage factors, including blown fuses in the system, problems with windings in the system voltage transformer (VT) devices and transient responses in the system capacitive coupled voltage transformers.

One alternative to directional comparison systems using voltage values is a current differential system, which uses only the electrical current value information from the power line. Current differential systems, also known as line differential systems, do not require voltage measuring devices, as they do not use voltage values in their fault determinations. Line differential systems are less sensitive to power swings and sudden load changes in the system and are generally less sensitive to or even immune from certain conditions on the line, including zero sequence mutual coupling effects and/or current reversals, among others. However, along with the advantages are several significant disadvantages, including reliance on high communication channel performance, which is required between the local and remote protective relays on the line. In addition, conventional line differential systems using phase current quantities are limited in their ground fault resistance coverage and also are a compromise to an extent in security under current transformer (CT) saturation conditions.

The present invention is a new line differential protection system which, while still dependent upon a communication channel, includes significant improvements relative to other system considerations, including high fault resistance coverage, improved operating characteristics and sensitivity, while at the same time maintaining power system security.

SUMMARY OF THE INVENTION

The present invention is a system for current differential protection for a three terminal power line configuration, comprising: means for determining selected current values present at each terminal of the three terminal line; means for processing the three selected current values in three successive processing operations using what we referred to as local terminal and remote terminal current values, wherein the current values at each one of the three terminals are processed in turn as a local currents and the current values at the other two terminals are in turn combined and processed as remote terminal currents, wherein each processing operation produces an output signal which is a trip signal or not in accordance with pre-selected processing criteria; and means for evaluating the results of the processing means such that when there is agreement between the three processing operations, the resulting system output signal is the same as that for the three processing operations and when there is disagreement, the output signal produced when the terminal with the maximum current values in the local terminal current is taken as the resulting system output.

BEST MODE FOR CARRYING OUT THE INVENTION

Figure 1:
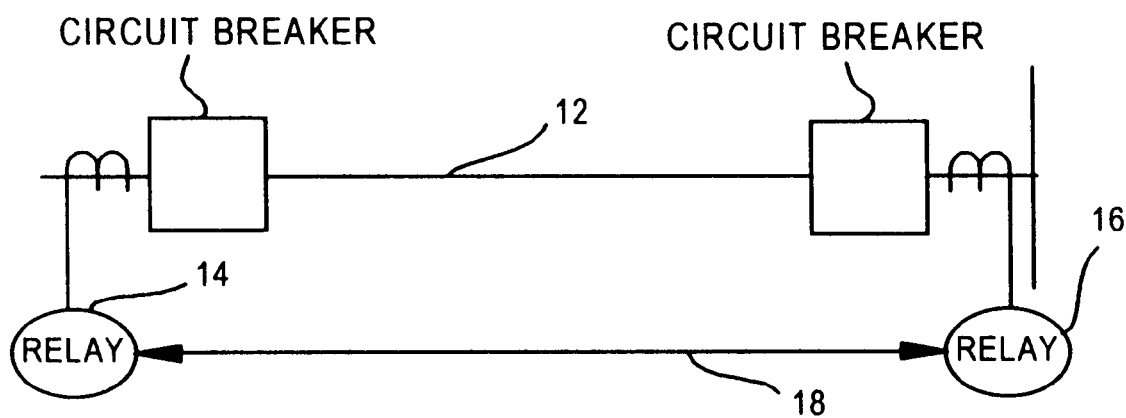
FIG. 1 is a simplified diagram showing a differential protection system for a power transmission line.

As indicated above, line differential protection systems are one type of several different protection arrangements possible for use with power transmission lines. In the line differential approach, a protective relay is located at each end of the protected line. In FIG. 1, for instance, a transmission line 12 has protective relays 14, 16 at opposing ends thereof. Circuit breakers 15 and 17 are associated, respectively, with relays 14 and 16. The communication between the relays is accomplished by a communication line 18 which could be a fiber optic cable or other communication medium. In operation, each relay 14, 16 measures line current values at its end of the protected line and transmits those values to the relay at the other end of the line. The local protective relay (relay 14 is referred to as the "local" relay in FIG. 1) will combine the currents it measures with the line current values from the remote relay. The sum of the current values will be zero when the fault is external (the fault is on a different line) to the protected line, while internal faults (on the protected line) will result in a non-zero combined current.

Figure 2A:
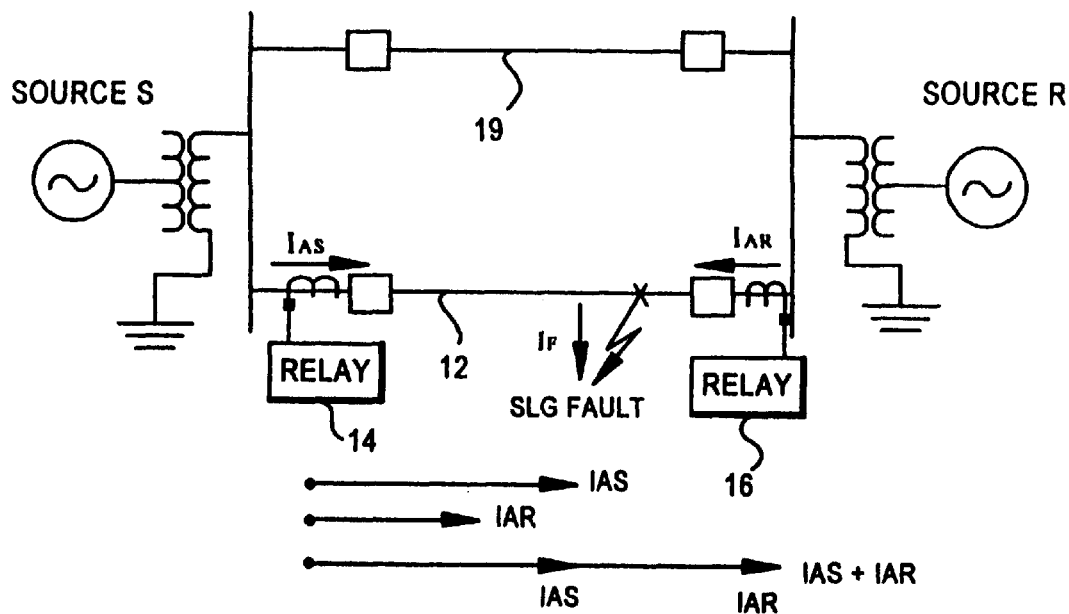
FIGS. 2A and 2B are diagrams illustrating current flow in a power transmission line for internal and external faults, viewed from the standpoint of the protection for line 1.
Figure 2B:
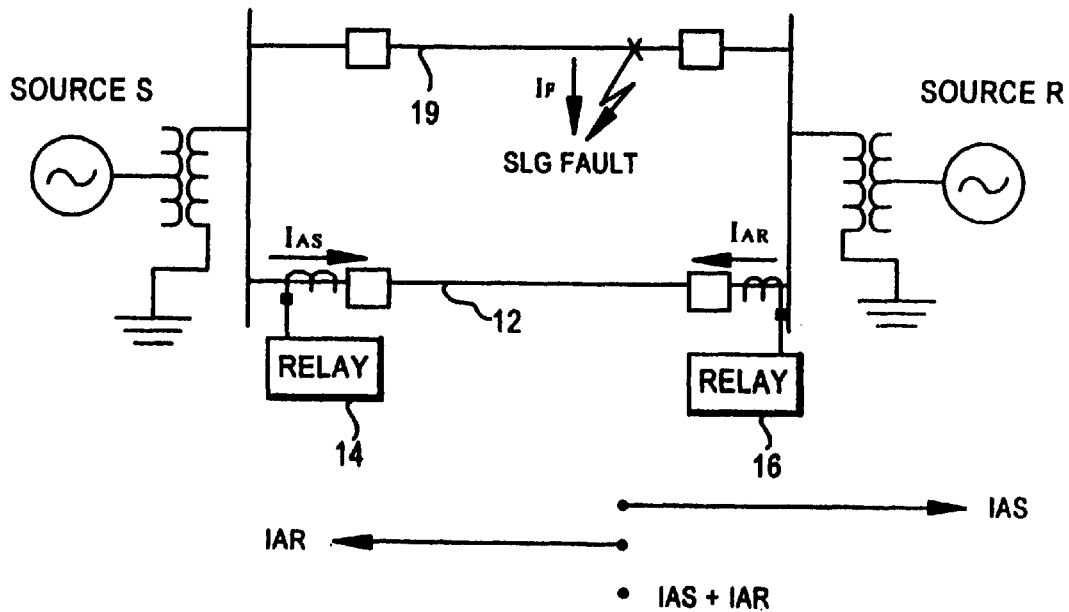

FIGS. 2a and 2b show transmission line diagrams, with current flow, for internal (line 12) and external (line 19) faults, respectively, which demonstrate the principle that external faults add to zero, while internal faults produce a non-zero combined current.

Figure 3:
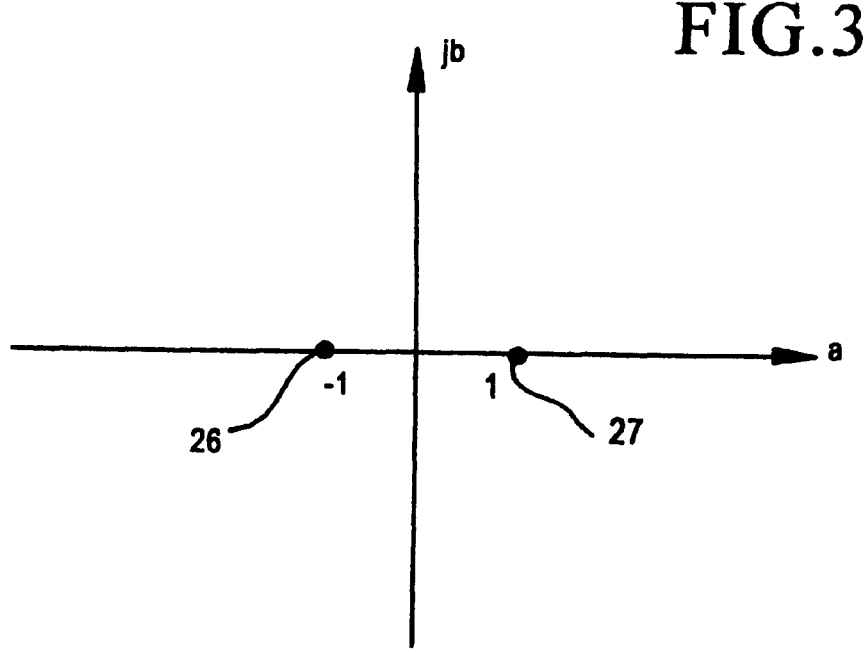
FIG. 3 is a diagram showing a current ratio plane with an ideal characteristic point for an out-of-section (external) fault or through load.

In the determination of faults on a transmission line using a line differential approach using electrical current values from opposing ends of the line, a current ratio characteristic or point is calculated and located in what is known as the current ratio plane, also known as the alpha plane, which is a graphical representation of the vector ratio of remote current ($I_R$) to local current ($I_L$). The current ratio plane or alpha plane is a well-known concept, explained in the book titled *"Protective Relays—Their Theory and Practice"*, by A. R. van C. Warrington, Chapman and Hall Ltd (1971), the relevant portion of which is hereby incorporated by reference. Line current values from the remote relay and the local relay are combined into a ratio of current values. This ratio has a magnitude and angle. This ratio can be plotted on the current ratio plane. Current flowing into the protected line is defined as positive (zero angle) at both terminals (line end points). FIG. 3 is a simplified diagram of an alpha (current ratio) plane. The labels for the two axes of the plane, a and jb, are derived as follows:

$$\frac{\vec{I_R}}{\vec{I_L}} = re^{j\theta} = a + jb$$

$$a = \text{Re}\left(\frac{\vec{I_R}}{\vec{I_L}}\right)$$

$$b = \text{Im}\left(\frac{\vec{I_R}}{\vec{I_R}}\right)$$

where Re and Im refer to the real and imaginary parts of the current ratio.

Ideally, load current appears in equal but opposite values at the two relays, so for load current and external faults, $$\frac{I_R}{I_L} = 1\angle 180°$$

which is represented by the point labeled 26 in FIG. 3.

With respect to internal faults, the fault current is equal at both ends of the line only when the line is homogenous and the contributions to the fault from both ends of the line are equal, e.g. when the two sources have equal strength and the fault is at the mid-point of the line. In such a case, $$\frac{I_R}{I_L}$$

is equal to $1\angle 0°$. However, as the internal fault moves toward the local relay, $I_L$ will increase and point 27 in the alpha plane will move toward the origin when viewed from the local relay (relay 14 in FIG. 2). For large remote currents, when compared to the local current, the point will move away from the origin, as viewed from the local relay. As the fault moves away from the local relay, $I_L$ will decrease and the point will move.

Various system factors, including non-homogenous power systems, will cause the angle of the fault current in the alpha plane at each terminal to be different, which results in the ratio point for an external fault to move up or down in the alpha plane along an arc which moves through the "a" axis.

It should be understood that a separate alpha plane representation will exist for each of the three phase currents $I_A$, $I_B$ and $I_C$, and for each of the three sequence current quantities (zero sequence, positive sequence and negative sequence). Various other factors, including line measurement errors, line charging current, CT (current transformer) saturation effects, transient effects in the power system compensation capacitors, digital filter transient response and other aspects of the relay system can cause the ratio of $$\frac{I_R}{I_L}$$

for external faults to move away from point 26 shown in FIG. 3. For internal faults, such factors will result in the $$\frac{I_R}{I_L}$$

ratio moving around on the alpha plane.

The movement from point 26 in the alpha plane for external faults i.e. from the ideal external fault or load, complicates the line differential system's decision in (1) declaring a fault on the protected line and tripping the associated circuit breaker on the line or (2) restraining the fault declaring action because the current ratio is due to load or an external fault or to system factors and/or errors. There is a region defined in the alpha plane which is a "restrain" region and a region which is an "operate" (trip) region, to enable appropriate circuit decision making with respect to the restrain and operate options.

In the present invention, all of the points in the alpha plane which should not result in a trip action by the line differential element define a restrain region for which there is no trip signal, while the remaining portions in the alpha plane are in the operate region for which a trip signal is produced.

Figure 4:
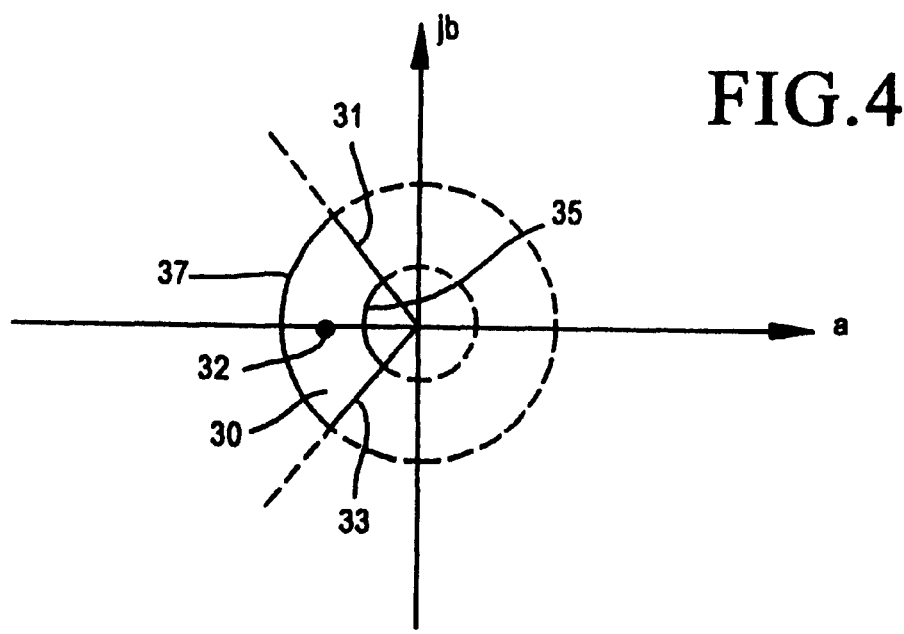
FIG. 4 is a diagram showing the current ratio plane operating characteristic of the system of the present invention.

FIG. 4 shows the restrain/operate regions used by the present invention in its fault determination decisions. The restrain region referred to at 30 in the alpha plane is centered on the ideal external fault point 32. The region 30 is defined first by current ratio angle (the radial lines 31 and 33 above and below the "a" axis), the range of which accommodates current ratio values affected by various system factors, including line charging current values, CT saturation and sample time and data alignment errors. Region 30 is further defined by the magnitude of the current ratio (the curved lines 35, 37), the range of which accommodates CT saturation and digital filter transient response, among other factors.

The logic circuitry of the present invention uses a series of logical comparisons and other functions to determine where the $I_R/I_L$ ratio is located in the alpha plane, and specifically whether the $I_R/I_L$ ratio is within the restrain region, in which case there is no trip signal. When the $I_R/I_L$ ratio is outside of the restrain region, into the operate region, a trip signal is produced if the measured current values have satisfied certain threshold and other characteristics.

As indicated above, there is a separate alpha plane representation for each phase of currents (Ia, Ib, Ic) and for each sequence current ($I_0$, $I_1$, $I_2$). In the present invention, alpha planes representations are used for all three phase currents (Ia, Ib and Ic). In this application, circuitry is shown and explained only for Ia phase current. The other phase currents (Ib, Ic) have identical associated logic circuits. In addition, negative sequence current values are used with a negative sequence alpha plane. The negative sequence portion increases the sensitivity of the overall system, particularly for unbalanced faults where the fault current is small. The use of negative sequence quantities, while providing better sensitivity than phase current elements, also includes security elements to prevent operation under erroneous conditions. The A phase, B phase and C phase circuits are included to provide tripping actions on three phase faults, while the negative sequence circuit is included for unbalanced faults.

The negative sequence circuit has significant benefits over other sequence circuits relative to out-of-section (external) faults with severe CT saturation. The use of negative sequence quantities provides higher ground fault resistive coverage for the protection system than the use of phase circuits alone. This is a desirable result, and also provides increased security during non-fault conditions. Unbalanced faults will produce negative sequence current in at least one line terminal for all internal faults. Hence, using the negative sequence quantities will result in detection of all unbalanced faults. Further, and quite importantly, thresholds for pickup action can be set at a very low level compared to the levels for the phase pickup action since the magnitude of negative sequence charging current is quite low. Typically, the difference between the negative sequence and phase charging currents will be 1/100 or even greater under steady state operating conditions. However, even a setting of 1/10 would be of great benefit.

Figure 5:
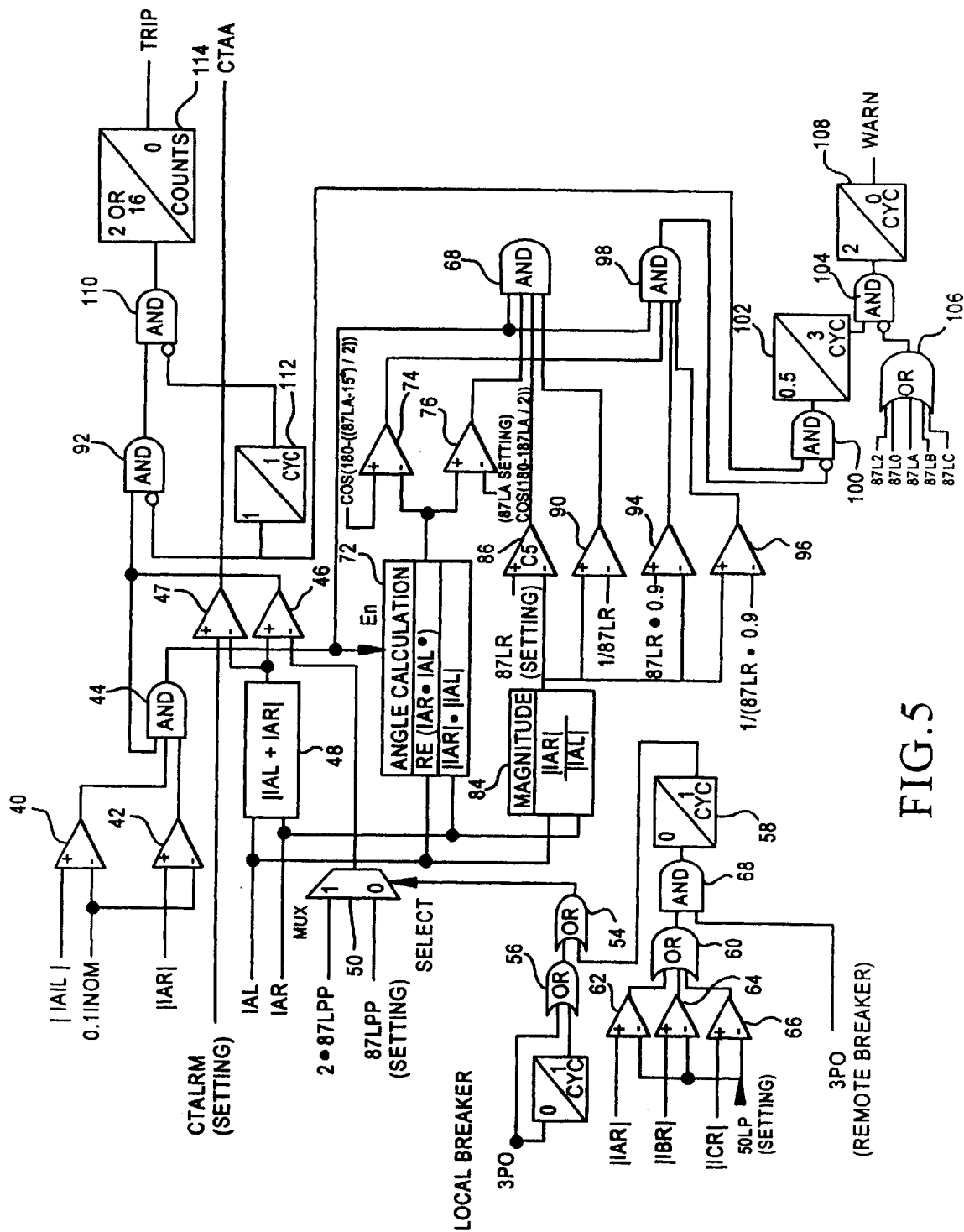
FIG. 5 is a logic diagram showing a first portion of the line differential system of the present invention.

FIG. 5 shows the logic circuit for the phase comparison portion of the line differential system of the present invention. FIG. 5 is for A phase current values. Similar logic diagrams can be used for B phase and C phase current values. Referring now to FIG. 5, comparator 40 compares the magnitude of the measured A phase current $I_{AL}$ at the local end of the power line against a selected threshold value, which in this case is 10% (0.1) of the nominal secondary current. This threshold provides assurance that the phase current has sufficient magnitude to have a reliable phase angle. Comparator 42 accomplishes the same function with respect to the remote current value obtained via the communication channel from the remote relay at the other end of the line.

AND gate 44 is responsive to the outputs of comparators 40 and 42, as well as the output of comparator 46. The function of comparator 46 is to enable the operation of the phase calculators when the sum (absolute value) of the magnitudes of local and remote currents $I_{AL}+I_{AR}$ is above a minimum threshold. The current summing function is accomplished by a summing circuit 41. The inputs to comparator 46 are provided by the current summing circuit 48 and a multiplexer element 50. The multiplexer element 50 will vary between two threshold current settings. A high output of comparator 46 establishes that a higher minimum sensitivity level has been exceeded.

The output of summing circuit 48 is also compared against a user settable CT alarm value. If the threshold is exceeded, a CTAA alarm signal is produced. The purpose of this comparison is to detect the situation where the user inadvertently leaves all three current inputs shorted around the relay (at one or more ends of the line).

The setting threshold for multiplexer 50 is above the maximum charging current for the power line. Charging current is the current which is necessary to charge the distributed line capacitors present in overhead and underground lines. The multiplexer threshold value, applied to comparator 46 will vary between the setting threshold at input 0 and a value which is twice the setting threshold, at input 1. The 0 or 1 threshold is selected by the output of OR gate 54, which is responsive to the output of OR gate 56 and timer 58.

The absolute values of the A phase, B phase and C phase currents from the remote relay are applied to comparators 62, 64 and 66, respectively, which compares those values against a single threshold setting selected by the user. This establishes minimum current values for the remote relay. A default setting in the embodiment shown is 0.1 amps. This setting value can be varied. The output of OR gate 60 is high if any of the outputs of comparators 62, 64 and 66 are high. The output of OR gate 60 is applied to one input of AND gate 68. The other input to AND gate 68 is a signal from the remote circuit breaker status logic, i.e. the circuit breaker at the remote end of the power line. The signal on this line is high if the breaker is open at the time. The output of AND gate 68 is applied to the input of timer 58, which is an edge triggered, instantaneous pickup, one cycle time-delayed dropout timer. The output of timer 58 goes high on the rising edge of the output of AND gate 68.

The output from timer 58 will remain high for one cycle following the termination of the high output from AND gate 68. The output from timer 58 is applied to OR gate 54. The output from OR gate 54, as indicated above, controls the setting of multiplexer 50, i.e. whether it is the user set value or twice that value. A high signal from OR gate 54 indicates a possible line energization; this causes the output of multiplexer 50 to be set to its high threshold value. The same function is true for the output from OR gate 56, which is responsive to a signal from the local circuit breaker status logic and the operation of timer 69.

The output of AND gate 44 is applied to an angle calculation circuit 72. As indicated above, the output of AND gate 44 is high when the output from comparator 46 is high, as well as the output of comparators 40 and 42, basically indicating that the local and remote current values are high enough that their angles can be relied upon for fault determination. The angle calculation circuit 72 implements the following calculation, using the A phase current phasors $I_{AL}$ and $I_{AR}$.

$$\text{angle} = \frac{\text{Re}[I_{AR} \cdot I^*_{AL}]}{|I_{AR}| \cdot |I_{AL}|}$$

The result of this calculation is a value representative of the angle between the local and remote currents, the value being a positive maximum when $I_{AL}$ and $I_{AR}$ are in phase (the angle difference is zero), a negative maximum when $I_{AL}$ and $I_{AR}$ are 180° out of phase and zero when $I_{AL}$ and $I_{AR}$ are in quadature (i.e. ±90° out of phase). The value from circuit 72 is applied to two comparators 74 and 76. In these comparators, the angle value is compared against threshold values. In comparator 76, the threshold value is:

$$\cos\left[180° - \left(\frac{87LA}{2}\right)\right]$$

The value 87LA is a designation for the range of angle through the "a" axis on the alpha plane within which a restrain action is indicated. The purpose of comparator 76 is to determine whether the angle of the current difference between $I_R$ and $I_L$ is within the angular restraint range established by the threshold value. If the $$\frac{I_R}{I_L}$$

angle difference lies within the angle range, the output of comparator 76 will be high, indicating a possible restrain condition for the A phase element portion of the system.

In comparator 74, the threshold value is:

$$\cos\left[180° - \left(\frac{87LA - 15°}{2}\right)\right]$$

This threshold angle is typically set somewhat smaller than the restrain region defined by the threshold setting value used in of comparator 76. This establishes the angle part of a quality boundary region within the restrain region. If the determined angle value is at a point near the boundary of the restrain region defined by the setting value of comparator 76, but still within the restrain region so that the relay does not trip the circuit breaker, the user should be notified that the protection boundary is close. This "boundary" angle can be varied, such as in the range of 5° and 25°.

The current values from the remote and local terminals for A phase current ($I_{AL}$ and $I_{AR}$) are also applied to a magnitude circuit 84. In magnitude circuit 84, the absolute magnitude values of the two current values $I_L$ and $I_R$ are used to determine a current magnitude ratio $I_{AR}/I_{AL}$. The output of circuit 84 is applied as one input to four comparators. In comparator 86, the output of magnitude circuit 84 is compared against a first setting value (87LR in FIG. 5), which is a designation for the setting for the outer radius line 37 of the restrain region in the alpha plane of FIG. 4. If the $$\frac{I_R}{I_L}$$

ratio value is less than the setting value, the output of comparator 86 is high. If it is greater than the setting value, it is low. The output of comparator 86 forms part of the security blocking logic (restrain) of the present invention.

The output of magnitude circuit 84 is also applied to comparator 90, where it is compared against the inverse of the setting value of comparator 86; this is the setting which establishes the inner radius line 35 for the restrain region. If the output value of magnitude circuit 84 is greater than the setting value, the output of comparator 90 is high. Otherwise, the output is low.

The output of comparators 86 and 90 are both applied to AND gate 68, along with the output of comparator 76 and the output of AND gate 44. A high output from AND gate 68 indicates that the overall fault determination circuit system is enabled under the above-described threshold security thresholds, and that the current ratio value is between the two established radius boundaries of the restrain region. This output from AND gate 68 is applied to an inverting input of AND gate 92.

The output of magnitude circuit 84 is also applied as one input to comparator 94. The other input to comparator 94 is a setting value which is equal to 90% (0.9) of the setting value of comparator 86. This could be varied, in the range of 75% and 95%. If the magnitude value is less than the threshold, i.e. less than 90% of the outer radius of the restrain region set by the setting value (threshold) of comparator 86, then the output of comparator 94 is high. Otherwise, it is low. This logic (comparator 94) establishes the outer radius part of the quality boundary area within the restrain region.

Lastly, the output of magnitude circuit 84 is applied to a comparator 96 where it is compared against a setting value of approximately 110% (1.1) of the setting value for comparator 90. This could also be varied to some extent. The output of comparator 96 will be high when the magnitude value of $$\frac{I_R}{I_L}$$

is greater than the setting value. This, establishes the inner radius part of the quality boundary area within the restraint region, slightly to the left from the inner radius value in FIG. 4.

The outputs of comparators 94 and 96 are applied as inputs to AND gate 98, along with the output from comparator 74 (which establishes the quality boundary area for the angle part of the restrain region) and the enable output from AND gate 44.

When the inputs to AND gate 68 are all high, meaning (1) that the remote and local current values are above minimum values (the output of AND gate 44 thus being high); and (2) the ratio of the currents fits within the restrain region of the current ratio plane, as defined by the angle determination from comparator 76 and the radius determination from comparators 86 and 90, the output thereof will be high, indicating that the line condition is possibly within the restrain region. The output of AND gate 98 is applied to one input of AND gate 100.

Further, when all of the inputs to AND gate 98 are high, indicating (1) that the local and remote currents are above minimum values and (2) that the angle and radius determinations are within the "nested" area defined by the quality boundary within the restrain region, as determined by comparators 94 and 96, the output of AND gate 98 is high. The output of AND gate 98 is applied to an inverting input of AND gate 100. The output of AND gate 100 will be low under such conditions and no alarm is provided (the relay's tripping action is thus restrained). When, however, one of the inputs to AND gate 98 is low, while all inputs to AND gate 68 are high, indicating a boundary location for the ratio of either angle or radius or both, within the restrain region, then the output of AND gate 100 goes high.

The high output of AND gate 100 is applied to a timer 102 which picks up after 0.5 cycles and has a time-delay dropout of three cycles. Hence, a high output condition for AND gate 100 must be true for at least 0.5 power cycles and must remain high for three power cycles after the output from AND gate 100 goes low. The output from timer 102 is applied to AND gate 104. Applied to an inverting input of AND gate 104 is an output of OR gate 106, the inputs of which are all of the other line differential elements, designated 87L2, 87L0, 87LA, 87LB, and 87LC, specifically the zero sequence and negative sequence elements and the phase elements for phases A, B and C. If any one of those elements have been picked up, the output of OR gate 106 will be high, and the output of AND gate 104 will be low. No warning signal is thus provided under that condition.

The output of AND gate 104 will thus be high when no other element has been picked up and the ratio of $$\frac{I_R}{I_L}$$

lies within the quality boundary region within the restrain region for at least 0.5 cycles and that this condition was present during the last three cycles. The high output from AND gate 104 is applied to a two-cycle security timer 108. The high output from timer 108 is a warning signal which indicates to the user that the system condition is close to a tripping condition, but that a trip is still being restrained.

As indicated above, the output of AND gate 68 is high when the ratio $$\frac{I_R}{I_L}$$

lies inside the restrain region and the $I_R/I_L$ current satisfies the threshold requirements. The output of AND gate 68 is applied to an inverting input of AND gate 92, along with the signal from comparator 46 (the operation of which was explained above). The output of AND gate 92 will be high only when the output of AND gate 68 is low, indicating that the $I_R/I_L$ ratio is outside of the restrain region, either from an angle or radius perspective.

The output from AND gate 68 is also applied to a one-cycle time-delayed pickup (TDPU), one-cycle time-delayed dropout (TDDO) timer 112. Timer 112 provides the overall circuitry of FIG. 5, a measure of CT (current transformer) saturation security following the clearance of an external fault (a fault on an adjacent line), where the CT at one end of the line saturates while the CT at the other end does not. The high condition of the output of AND gate 68 must be true for at least one cycle and must be present previously for at least the past one cycle to satisfy timer 112. The output from timer 112 is applied to an inverting input of AND gate 110. The output from AND gate 110 is applied to a timer 114. Timer 114 has at least two possible values in the embodiment shown, although there could be more or fewer. The two values in this embodiment are a two-count pickup or 16-count pickup, with each count being 1/16 of a power system cycle.

The output of timer 114 will be high when the $I_R$ and $I_L$ are above threshold levels and the CT has recovered sufficiently from saturation. Additional security is provided when the pickup of timer 114 is increased from two counts to 16 counts. The output of timer 114 is a trip signal for the circuit breaker; it indicates the presence of an $$\frac{I_R}{I_L}$$

ratio outside of the restraining region, with various security criteria having been satisfied.

The above logic circuit is, as indicated previously, for the A phase current portion of the phase differential comparison part of the system of the present invention. Similar circuits are provided for B phase and C phase comparisons.

Figure 6:
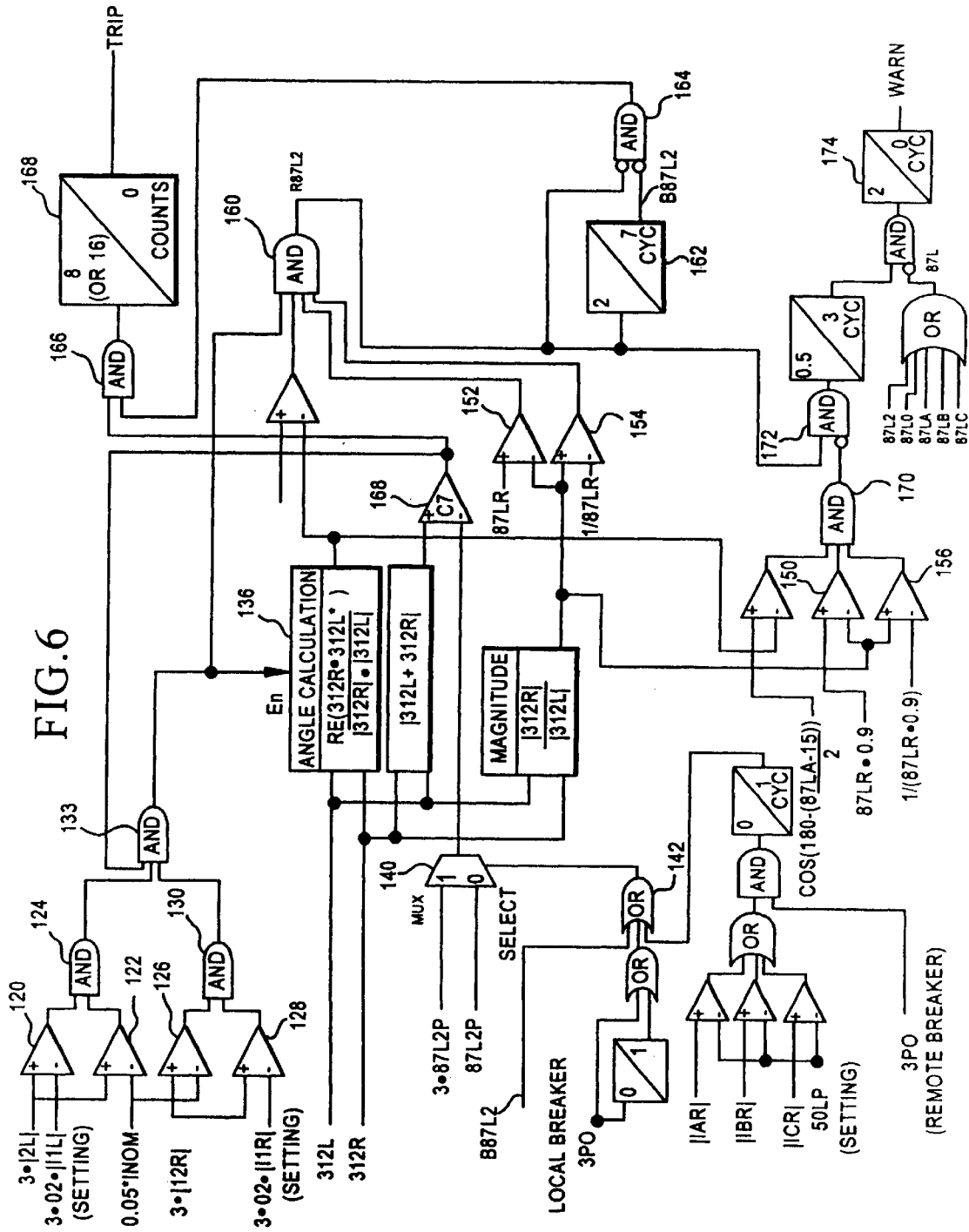
FIG. 6 is a logic diagram showing a second portion of the line differential system of the present invention.

In addition to the phase comparison operations, which are accomplished for all three phases, the present invention includes a negative sequence differential current circuit shown in FIG. 6. The negative sequence differential element is similar in many respects to the circuit of FIG. 5. However, instead of local and remote phase currents being used, local and remote negative sequence quantities are used (referred to as $3I_2$ quantities in FIG. 6).

The magnitudes of the negative sequence current quantities ($3I_{2L}$ and $3I_{2R}$) are compared against threshold values to ensure that the negative sequence currents have a reliable phase angle. A total of four comparisons are made. Comparators 120 and 122 are used with AND gate 124. The output of comparator 120 is high if the local negative sequence current ($3I_{2L}$) is greater than a setting of $a \cdot 3I_{1L}$, where $3I_{1L}$ is the positive sequence quantity from the local terminal. The "a" factor is usually within a range of 0.02–0.05, with a typical setting of 0.03 established to accommodate CT ratio errors.

In comparator 122, a comparison is made between the negative sequence current $3I_{2L}$ and a 0.05 nominal secondary current value, i.e. 5% of the nominal secondary current, which is typically either 1 amp or 5 amps depending on the CT used. The same comparisons are made for the remote negative sequence current quantities by comparators 126, 128. The output of comparators 126 and 128 are applied to AND gate 130, the output of which is applied to AND gate 133, along with the output of AND gate 124 and the output of comparator 168. The function of AND gate 133 is similar to AND gate 44 in FIG. 5.

Figure 7:
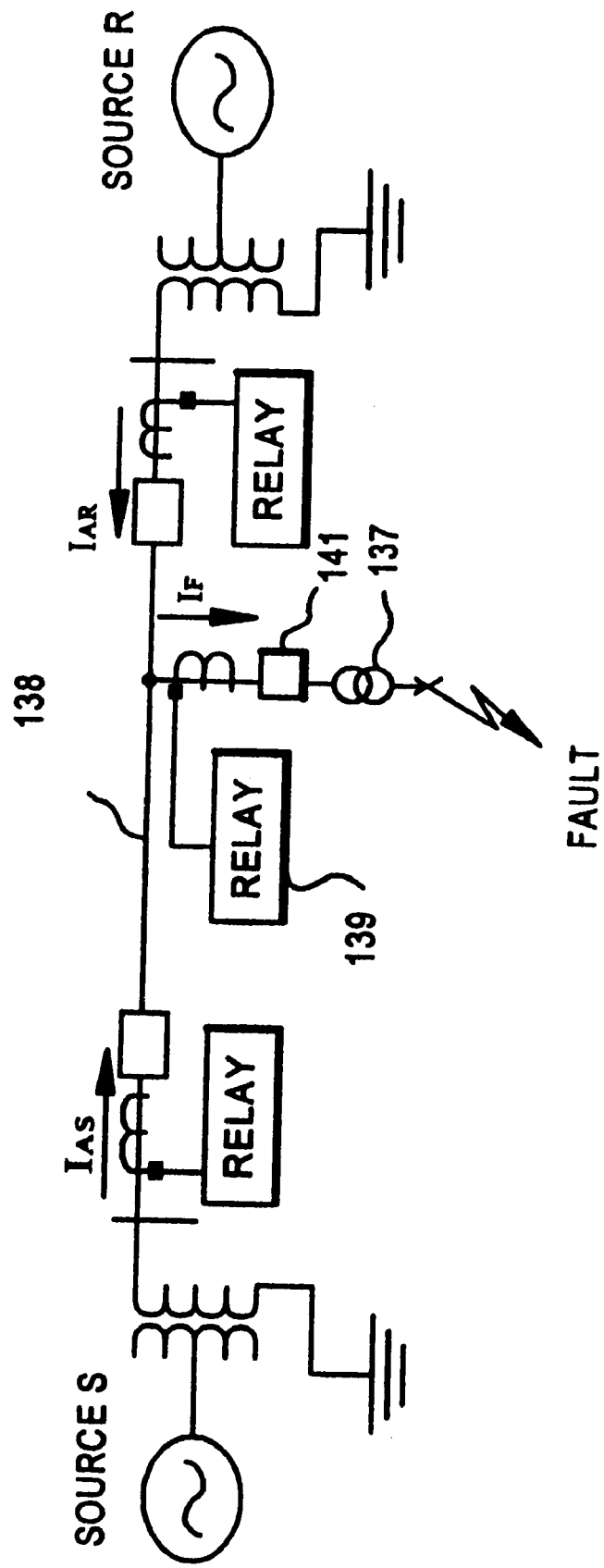
FIG. 7 is a diagram showing a typical load circuit.

Circuit 135 calculates the sum of the local and remote negative sequence currents $I_{2L}$ and $I_{2R}$. This same output is also useful as the input to a time-overcurrent (TOC) element. This element coordinates with a tapped load whose current is not included in the differential measurements. Because negative sequence charging current is negligible, this negative-sequence TOC element can be set very sensitively. As shown in FIG. 7, the tapped load transformer 137 extends from the protected line 138, between the local and remote relays. The tapped load transformer is protected by relay 139 and circuit breaker 141.

As compared with a phase TOC, the negative-sequence TOC element can sense much higher impedance ground faults located on the tapped transformer low-side. If the transformer is configured as delta-wye-grounded, a zero-sequence TOC cannot sense low-side ground faults, as the winding of the transformer blocks these currents from flowing in the high-voltage side of the power system.

If the transformer is configured as grounded-wye-delta, the negative-sequence TOC is more secure for out-of-section faults than a zero sequence TOC, as the grounded-wye acts like a unmeasured zero-sequence current source.

For the fault shown in FIG. 7, circuit 135 measures the total fault current flowing into the transformer. This same current is also measured by the transformer high-voltage side relay 139 or by a fuse protecting the transformer bank. Because the line-end relay measures the same current as the tapped load transformer protection, direct time coordination can be readily accomplished. If the fault is instead on the protected line, the time-overcurrent element undesirably delays high-speed tripping. To overcome this disadvantage, a high-set overcurrent element (operating from total line current) is included to by-pass the time-overcurrent element. This solution is very effective in many applications as the difference in fault duty between transformer high-side and low-side faults is appreciable. In those applications where the strength of Source S or Source R or both changes appreciably, a distance element can be used instead of the high-set overcurrent.

Referring again to FIG. 6, the output of AND gate 133 enables the angle calculation block 136, which produces the angle information for the negative sequence current alpha plane determination. Multiplexer 140 in FIG. 6 has a similar function to multiplexer 50 in FIG. 5 and switches between the user set minimum pickup value and a pickup value three times the user set value. This is slightly different from that of FIG. 5, which switches between a user set value and a value twice that value. Again, this switching is used because of the expected inrush of charging current during those times that the power line is being energized (after the breaker has been opened and then is closed again), or the remote breaker being closed, which produces the possibility of changing the source of charging current, or the possibility that all three breaker poles for the line will not close simultaneously. Hence, to increase security of the system, the minimum trip threshold is raised when the breaker is being signaled to close. Multiplexer 40 is controlled by the output from OR gate 142. The circuit driving OR gate 142 is identical to that for FIG. 5, with one additional input value for OR gate 142, a signal from another part of the circuit of FIG. 6, discussed below.

Comparators 150, 152, 154 and 156 are used to establish the radius portion (inner and outer boundaries) of the restrain portion of the alpha plane characteristic and the 0.9 quality border area between the inner resulting "nested" portion and the full restrain region. The border area can be varied, as discussed above for the phase comparison portion of the present system.

In the negative sequence quantity arrangement of FIG. 6, there is no open CT alarm signal and hence no CT alarm output signal because high impedance faults during a no-load condition cannot be distinguished from open CT circuits during light loads. The output of AND gate 160 in FIG. 6, which is high when the negative sequence current ratio is within the restrain region, is comparable to the output from AND gate 68 in FIG. 5. The output from AND gate 160 is then applied to a timer 162 and to an inverting input of AND gate 164. The output of timer 162 is applied to another input of AND gate 164, which is also inverting. The output of AND gate 164 is then applied to one input of AND gate 166, along with an output from comparator 168.

The output of AND gate 166 in FIG. 6 is comparable to the output of, with similar input conditions, AND gate 110 in FIG. 5. The output of AND gate 166 in FIG. 6 is applied to a timer 168, the output of which is the trip signal output for the negative sequence differential logic portion of the present invention. The timer 168 has at least two possible pickup values, although more (or fewer) could be provided, either eight or 16 counts in the embodiment shown (½ power cycle or 1 power cycle). In normal operation, the operating count is eight; however, when the control signal to the multiplexer 140 is high, the count increases to 16 for additional security. This count, of course, could be changed, depending upon design considerations. The output of timer 168, being a trip signal, indicates that the current ratio characteristic of the negative sequence current is in the operate region in the alpha plane, as opposed to the restrain region.

Referring still to FIG. 6, the output of AND gate 160 and AND gate 170 are applied to an AND gate 172. This is quite similar to the input and operation of AND gates 68, 98 and 100 in FIG. 5. The logic circuitry from AND gate 172 to timer 174 is identical to that in FIG. 5. A high output from timer 174 indicates that the current ratio is within the quality boundary areas of the restrain region in the alpha plane, warning the user that the system is close to a trip condition for an out-of-section (external) fault.

The combination of the phase differential logic and the negative sequence differential logic provides a reliable, fast, but secure determination of faults on a protected line. The use of negative sequence differential protection in particular provides the desired high ground fault resistance coverage and the security for current CT transformer saturation which the phase differential logic above does not provide. It should be understood, however, that modification to the above circuitry could be made. For instance, zero sequence quantities could be used instead of negative sequence quantities in FIG. 6. The performance is not quite as good but is acceptable. Further, in some cases, positive sequence quantities could be used instead of the phase quantities of FIG. 5 (in combination with the circuit of FIG. 6).

Figure 8:
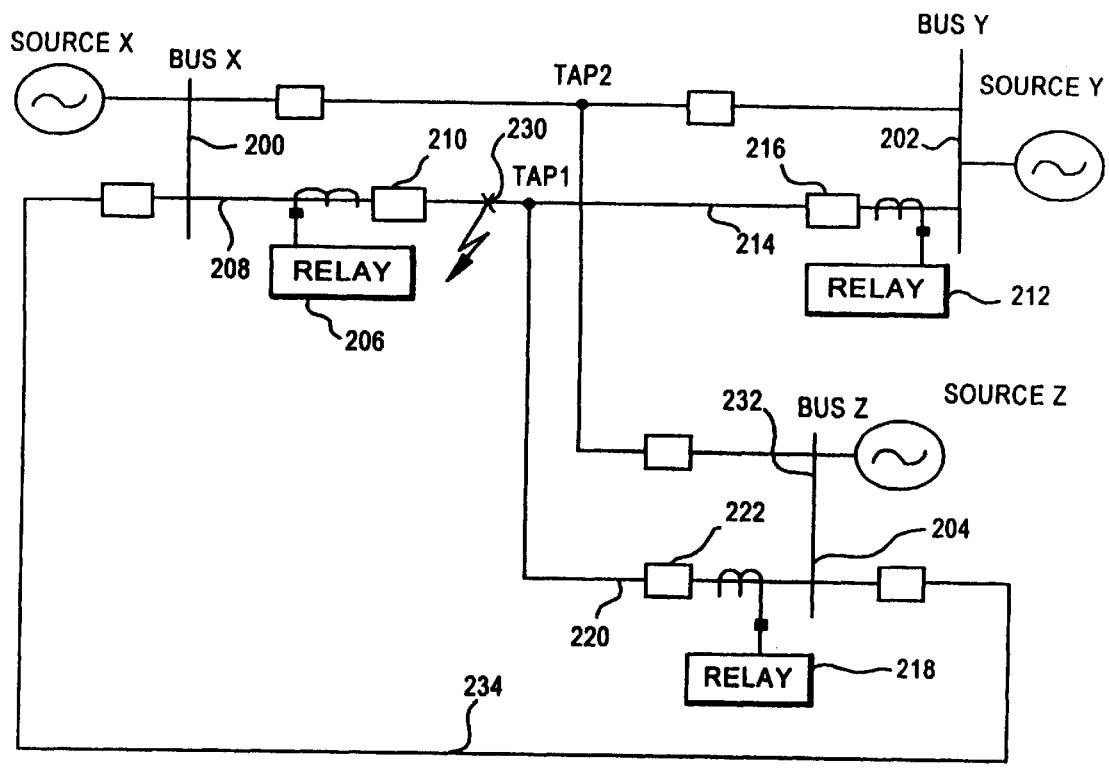
FIGS. 8–12 are diagrams for a three terminal line configuration.

The above description is directed toward two terminal power line applications, such as shown in FIG. 1, with one local terminal and one "remote" terminal. Both phase currents (A, B, C phase) and negative sequence currents from the local and remote terminals are used in a differential processing circuit to develop a ratio of remote current to local current. The following description concerns an extension of the above approach to a three terminal line application. A three terminal line is illustrated in FIG. 8. Three separate line terminals are shown at 200, 202 and 204, also referred to as terminal (source) X, terminal (source) Y and terminal (source) Z. Each terminal has associated protective relays and circuit breakers. Relay 206 is associated with terminal 200 on line portion 208 with circuit breaker 210. Relay 212 is associated with terminal 202 on line portion 214 with circuit breaker 216. Relay 218 is associated with terminal 204 on line portion 220 with circuit breaker 222.

The line portions 208, 214 and 220 in the three terminal arrangement will operate a majority of time with their associated circuit breakers (210, 216 and 222) all closed. It should be understood, however, that the three terminal configuration of FIG. 8 can be changed to a two-terminal line configuration by simply opening one of the three breakers. The processing circuitry described below will also operate appropriately under such two terminal conditions in addition to the three terminal configuration.

It is also desirable that the three-terminal differential processing circuitry described below properly operate for any fault on line portions 208, 214 and 222 with one or two breakers open.

It is well known that a primary complication for three terminal applications is "outflow" present current at one of the three terminals during an in-section (internal) fault which is located close to one of the other terminals. For example, a fault location such as shown at 230 in FIG. 8 may result in current flow into power bus line 232 when the impedance of line portion 220, plus the impedance of line portion 234, is less than or equal to the impedance of line portion 208. Current flowing into bus 232 at terminal 204 under such conditions is referred to as "outflow" current. Such outflow current can result in erroneous determinations from the phase and negative sequence logic circuits shown in FIGS. 5 and 6. This same outflow current also defeats common communication-assisted tripping schemes such as Permissive Overreaching Trasfer Trip (POTT) and Directional Comparison Blocking (DCB) as these schemes use distance and/or directorial elements to make a tripping decision. The outflow current makes those elements declare the fault as external and thus block high speed tripping by the communication assisted tripping scheme.

Another well known complication, also resulting in erroneous processing determinations, is CT (current transformer) saturation under particular fault conditions. When a particular CT saturates, the magnitude of the CT secondary current decreases and the secondary current angle advances. This has a detrimental effect on the accuracy of the resulting trip/restrain decision of the processing circuitry.

Figure 11:
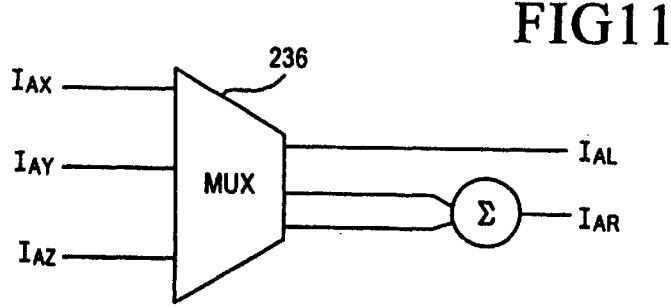
Figure 9:
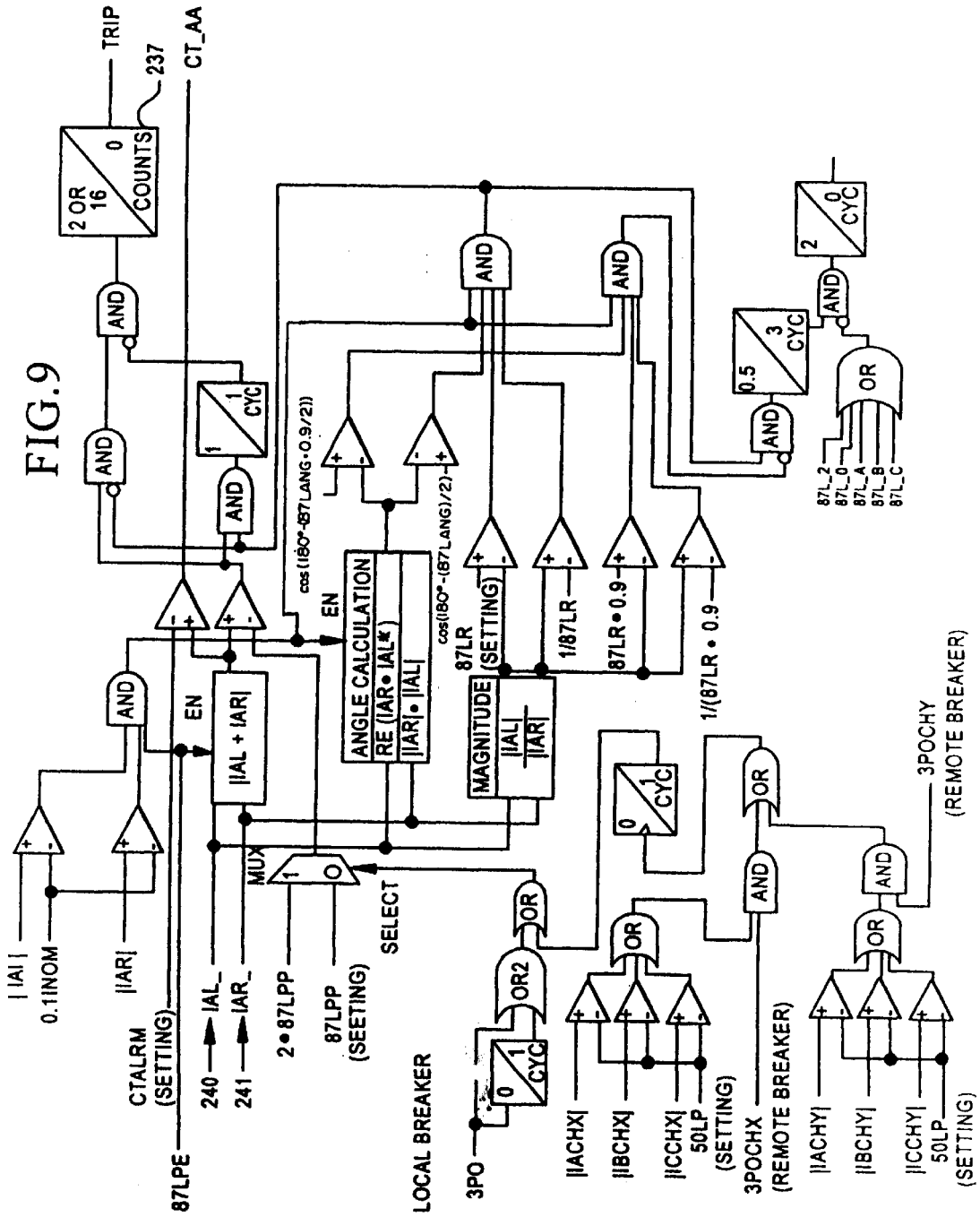
Figure 10:
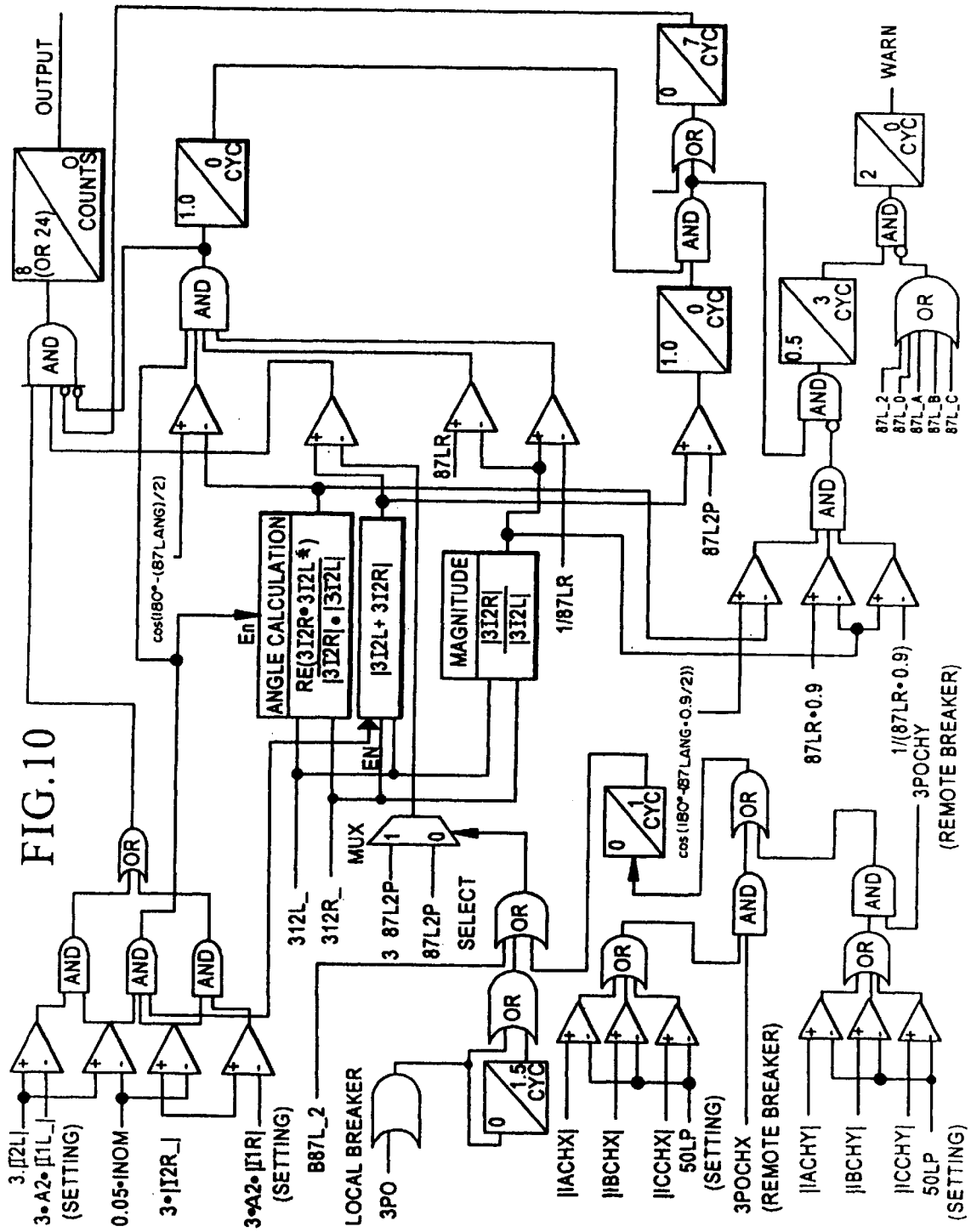

FIGS. 9 (phase current inputs) and 10 (negative sequence current inputs) are logic processing circuits which are basically quite similar to those in FIGS. 5 and 6. They include inputs for "local" and "remote" currents. The circuit of FIG. 11 is used to process the current inputs to the three terminals of a three terminal configuration into local and remote current values for input to the circuitry of FIGS. 9 and 10. FIG. 11 illustrates "A" phase inputs from the three terminals (from terminals X, Y and Z of FIG. 8). Similar processing circuits are used for "B" phase and "C" phase current values. Referring to FIG. 11, the A phase currents from the three terminals are used to produce a local current (from just one of the three terminals) and a remote current, the remote current being a combination of the currents from the other two terminals.

The three currents are applied to a multiplexer 236 which produces directly the local current from one terminal, e.g. the X terminal, and combines currents from the other two terminals, e.g. the Y and Z terminals, the two combined currents being referred to as the remote current. Referring now to FIG. 9, these local and remote current values from multiplexer 236 are then applied to inputs 240 and 241. The following explanation is for FIG. 9 (phase currents). However, the same explanation is true for the negative sequence logic of FIG. 10. The circuits of FIGS. 9 and 10 can be used together, just like the circuits of FIGS. 5 and 6. The currents from the three terminals are processed by the logic circuit of FIG. 9 three times, with the "local" current input being from each terminal once in turn and the remote current being the combination of the currents from the other two terminals, i.e. $I_{AX}$ (local) and $I_{AY}$ and $I_{AZ}$ (remote) for a first comparison; $I_{AY}$ (local) and $I_{AX}$ and $I_{AZ}$ (remote) for the second comparison; and $I_{AZ}$ (local) and $I_{AX}$ and $I_{AY}$ (remote) for the third comparison. Each set of "local" and "remote" current values are processed in turn by the circuit of FIG. 9 to provide either a "trip" or restrain signal at output 237.

After the three comparisons have been completed (referred to as one processing interval), the protective relay compares the results. For internal faults on the three terminal line, without any outflow current, all three processing operations will produce a trip signal, i.e. there will be an agreement between the outputs for the three processing operations. This confirms that tripping of the circuit breaker is appropriate for the particular fault. However, if one of the terminals has outflow current, or where there is CT saturation at one of the terminals, the three processing operations may produce different results. One or two of the operations will produce a different output; i.e. one or two operations will produce a trip declaration while the others will produce a restrain (non-trip) declaration. In this situation, the outputs of 237 are in disagreement relative to a particular fault.

Figure 12:
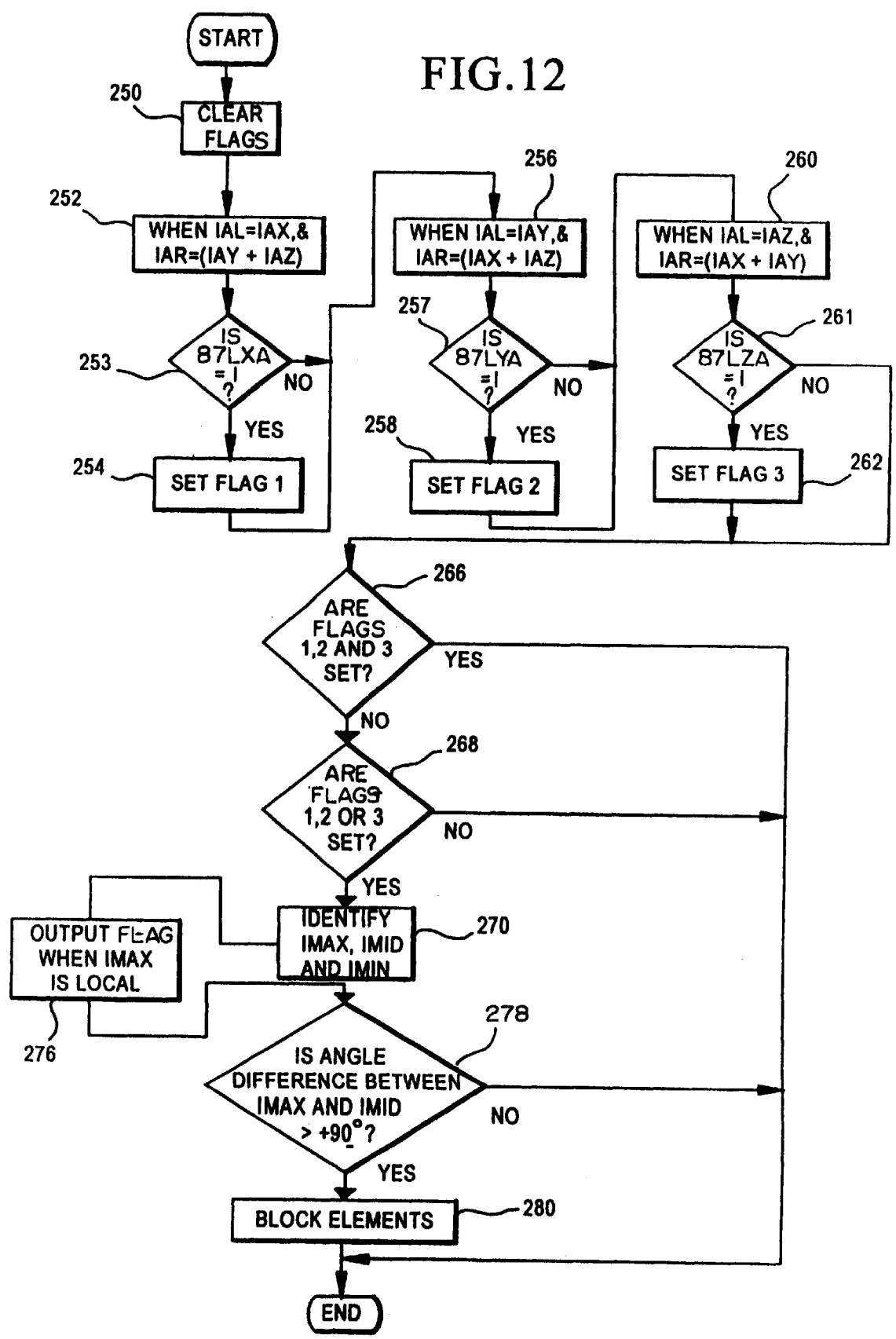

The circuit of FIG. 12 provides an accurate resolution of the disagreement and provides a decision as to whether to trip the circuit breaker or not (restrain). The circuit of FIG. 12 uses A phase current notation for illustration. Similar logic circuits are used for B and C phase current values and for negative sequence and zero sequence current values.

Referring now to FIG. 12, at the start of the process, all the results of the last processing event are cleared (step 250). The processing circuit of FIG. 12 in the embodiment shown operates every 1/16 of a power system cycle, since current values are obtained at this interval, although this could be changed if desired. As noted previously, A phase current values from the three terminals are processed three times, with the current at each terminal (X, Y and Z) being the "local" terminal current once and the combination of the two other current values being the remote current in each case. The three different sets of local and remote current values are processed in turn by the circuit of FIG. 12.

If the result of the processing of any current value set (local and remote) at output 237 is a trip signal, the output is set to one for that set. Otherwise the output for that set is zero. This is done for all three sets of local and remote currents. The logic of FIG. 12 evaluates the status of the three outputs after processing of the three sets of current values have been completed. In detail, step 252 evaluates the output when the local current is the current at terminal X (terminal 200) and the remote current is the combination of the currents at terminal Y (terminal 202) and Z (terminal 204). If the output is a one (step 253), a first flag is set (step 254). The same steps occur at 256 through 258 when the current at terminal Y is the local current and the currents at terminals X and Z are the remote current. The same steps 260 through 262 are accomplished when the current at terminal Z is the local current and the current at terminals X and Y are combined to form the remote current.

Flags are thus set (one) at 254, 258 and 262 if there are trip outputs for those current value sets. Otherwise the flags are not set (zero).

In step 266, an inquiry is made as to whether all three flags are set. If they are, then all three processing operations agree, and there is no need for further processing. The result is a trip signal.

If the three flags are not all set, then at step 268 it is determined whether any of the flags are set. If not, then there is again agreement between the three operations and no trip signal is provided. The output of the differential elements are blocked/restrained.

If at least one flag is set, however, then the magnitude of the currents at the three terminals, which have been previously measured for processing, are evaluated to determine which current is the maximum current, which is the minimum current and which is the midpoint current, i.e. the currents at the three terminals are ranked in order of magnitude. This is accomplished at processing step 270. The output of the processing circuit when the terminal with the maximum current is the local current is determined. It is this output which provides the correct determination when there is a disagreement between the three outputs (step 276).

The use of Imax alone will provide the correct result in basically all foreseen circumstances. However, FIG. 12 uses an additional security step 278 in case of an unexpected setup anomaly in the processing circuit. It is physically impossible that the angle difference between the maximum and midpoint currents is greater than 90° for an internal fault. Hence, an angle test is made; if the angle is great than 90°, then the output of the differential elements are blocked (no trip output)at step 280, regardless of the result of step 276.

Hence, a system has first been disclosed for two terminal lines which accurately determines faults on a transmission line using a line differential protection circuit with current values from the local and remote ends of the protected line. The system develops a ratio of remote current to local current, locating the ratio within a current ratio (alpha) plane, the system including a restrain region defined in the alpha plane which can be modified by the user, both in angle and radius values. Phase differential logic is combined with negative sequence differential logic to provide high fault resistance coverage as well as security for CT saturation. The system is thus highly secure, as well as sensitive, so as to make accurate and fast determination of faults while avoiding tripping when a fault has not actually occurred within the protected line section.

Also, such a system for a three terminal line configuration has been disclosed. This arrangement results in accurate evaluation of line conditions so that a correct trip/restrain decision can be made even in the situation where there is outflow current and/or CT saturation in the three terminal circuit. This arrangement also uses a combination of phase currents and negative sequence (or zero sequence) currents. Positive sequence currents can also be used in place of phase currents.

Although a preferred embodiment of the invention has been disclosed here for purposes of illustration, it should be understood that various changes, modifications and substitutions may be incorporated without departing from the spirit of the invention, which is defined by the claims which follow.

What is claimed is:

1. A system for current differential protection for a three terminal power line configuration, comprising:

means for determining selected current values present at each terminal of the three terminal line;

means for processing the three selected current values in three processing operations using local terminal and remote terminal current values, wherein the current values at each one of the three terminals are processed in turn as local currents and the current values at the other two terminals are in turn combined and processed as the remote terminal currents, wherein each processing operation produces an output signal which is a trip signal or not in accordance with pre-selected processing criteria; and means for evaluating the results of the processing means, wherein when there is agreement in the output signals between the three processing operations, a resulting system output signal is the same as the output for the three processing operations and wherein, when there is disagreement, the output signal produced when the terminal with the maximum current values is the local terminal current is taken as the resulting system output.

2. A system of claim 1, wherein if the angle between the maximum terminal current and the terminal current between the maximum and the minimum is greater than 90°, the system output signal is a blocking signal and not a trip signal.

3. A system of claim 1, wherein the selected current values are phase current values and one of a) negative sequence current values and b) zero sequence current values.

4. A system of claim 1, wherein the selected current values are positive sequence current values and one of a) negative sequence current values and b) zero sequence current values.

5. A system of claim 1, wherein each processing operation which results in a trip output signal sets a flag, with the processing means determining how many flags have been set, wherein if all the flags have been set, no further processing is necessary and the system produces a trip output signal, and wherein if none of the flags have been set, no further processing is necessary and the system produces an element block system output signal.

* * * * *